No. 765,249. PATENTED JULY 19, 1904.
S. J. McDONALD.
HOSE COUPLING.
APPLICATION FILED MAR. 21, 1903.
NO MODEL.
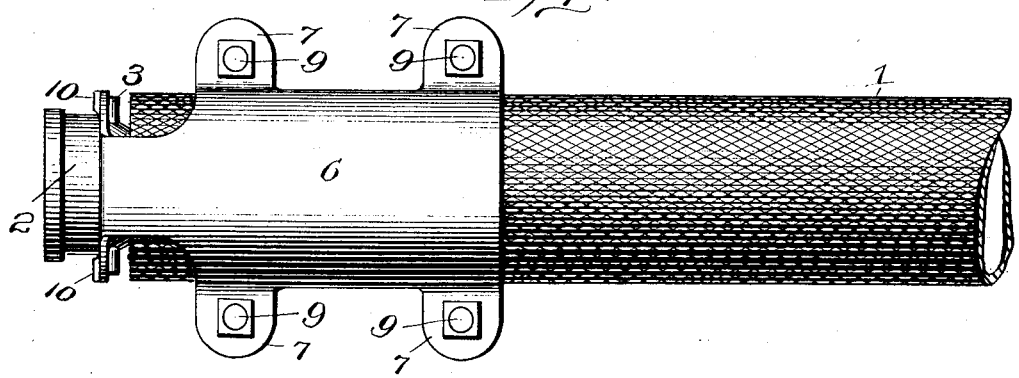
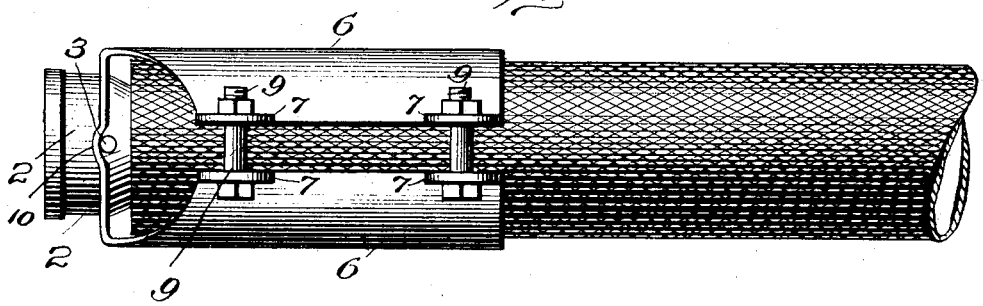
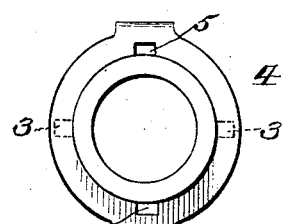
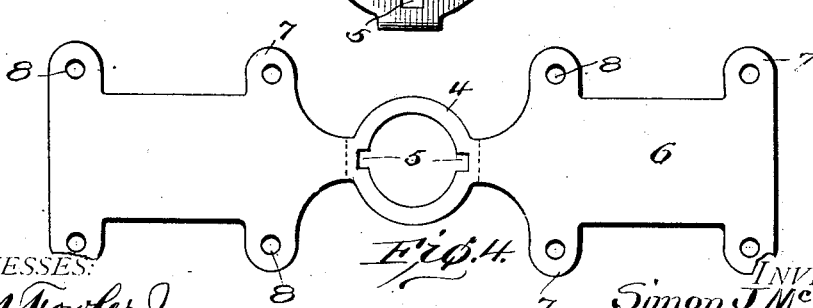
WITNESSES:
J. M. Fowler Jr.
C. S. Frye.
INVENTOR
Simon J. McDonald.
BY
W. T. Fitzgerald Co.
Attorneys.

No. 765,249.　　　　　　　　　　　　　　　　　　　　　　　　Patented July 19, 1904.

UNITED STATES PATENT OFFICE.

SIMON J. McDONALD, OF DETOUR, MICHIGAN, ASSIGNOR TO WILLIAM H. LEWIS, OF DETOUR, MICHIGAN.

HOSE-COUPLING.

SPECIFICATION forming part of Letters Patent No. 765,249, dated July 19, 1904.

Application filed March 21, 1903. Serial No. 148,913. (No model.)

*To all whom it may concern:*

Be it known that I, SIMON J. McDONALD, a citizen of the United States, residing at Detour, in the county of Chippewa and State of Michigan, have invented certain new and useful Improvements in Hose-Couplings; and I do hereby declare the following to be a full, clear, and exact description of the invention, such as will enable others skilled in the art to which it appertains to make and use the same.

My invention relates to hose-couplings, and more particularly to an attachment adapted to fit over the end of a hose and lock the joint of the coupling proper received by the end of said hose; and my invention consists of certain features of construction and combination of parts, as will be hereinafter fully described and claimed, reference being had to the accompanying drawings, which are made a part of this application.

The object of my invention is to provide simple though reliably-efficient means adapted to engage a portion of one member of a hose-coupling and prevent the same from being blown out by the force of the escaping water.

A further object, among others, is to provide means for readily attaching and detaching my invention in its operative position upon the end of a hose.

Other objects and advantages will be made clearly apparent by reference to the accompanying drawings, which are made a part of this application, and in which—

Figure 1 shows a side elevation of my invention complete. Fig. 2 shows a similar view taken at right angles to the showing made in Fig. 1. Fig. 3 is an end view of my hose attachment as applied to use upon the end of a hose-section, while Fig. 4 shows my invention as blanked out of a piece of suitable sheet metal ready to be bent into the desired form for fitting around the end of a hose.

Designating-numerals will be employed in order to conveniently refer to the various details of my invention and coöperating parts, the same numeral applying to a similar part throughout the several views.

In materializing my invention I provide suitable clamping means adapted to engage the part of the coupling contained in the end of the hose and securely lock the same in place.

Referring to the numerals on the drawings, 1 indicates the end of a hose of the usual or any preferred construction, within which, as is common, is inserted the stem of one member 2 of the coupling proper. The member 2 is provided upon diametrically opposite sides with lugs 3, which may be readily formed in any preferred way, as by casting the same when the coupling member is formed, or suitable apertures may be provided and said lugs may be threaded into said apertures, as will be obvious.

Designed to coöperate with the lugs 3 is the ring-like member 4, having an opening of proper size to fit snugly around the member 2, suitable recesses 5 being provided on the inner edge of the ring or collar 4, whereby when the coupling member 2 is turned said recesses 5 will register with the position of the lugs 3, carried by the coupling member, and thus permit such member to be withdrawn from its seat in the end of the hose.

In Fig. 3 I have indicated by dotted lines the position of the lugs when the member 2 is turned into a locked position. I prefer to form the collar or ring section 4 and the anchoring-plates 6 all integral or from one continuous piece of suitable sheet metal, as more clearly shown in the blank presented in Fig. 4, said anchoring-plates 6 being also provided with integral extensions or ears 7, having suitable apertures 8, through which when a pair of said ears are bent or extended outward parallel with each other they may be readily secured, as by the locking-bolts 9 extending through said apertures.

By means of the construction hereinbefore described it is therefore clearly apparent that the retaining-ring 4 and the plates 6 may be reliably anchored in position upon the end of the hose, and thereby insuring that the coupling member 2 will be very securely retained in its seat in the end of the hose.

By reference to Figs. 1 and 2 it will be seen that I have provided suitable seats 10 in the ring or collar section 4, adapted to more securely engage and retain the lugs 3 in place when adjusted therein.

It is obvious that the anchoring-plates 6 may be formed of proper size, so as to practically inclose one-half of a contiguous part of the hose, thereby disposing the ears 7 very close to each other, and, if preferred, said ears may be caused to overlap each other and be soldered in place, leaving the ears upon the opposite side only to be secured by locking-bolts.

It will be understood that the ear-sections 7 may be made very small in size, so as to accomplish a reliable performance of their office and yet present very little obstruction or impediment to the free use of the hose.

While I have described the preferred combination and construction of parts deemed necessary in materializing my invention, I wish to comprehend such equivalents and substitutes as may be considered as falling fairly within the scope of my invention.

What I claim as new, and desire to secure by Letters Patent, is—

1. In a hose attachment, the combination with the hose and a coupling member 2 having lugs 3, of a ring-like member 4 having recesses adapted to receive the lugs 3 and also having seats 10 formed by bending a portion of the surface of the ring-like member outwardly, and at diametrically opposite points to the recesses whereby when said lugs enter said seats said member 2 will be held against casual rotation, anchoring-plates formed integral with said member 4, having apertured ears and means to clamp said plates upon the hose, substantially as specified and for the purpose set forth.

2. The herein-described hose attachment comprising the combination with a hose and a coupling member having lugs upon opposite sides, of an anchoring-collar adapted to fit around the end of the coupling member, said collar having recesses in its inner edge adapted to receive said lugs; anchoring-plates adapted to encircle the end of the hose and ears extending from said plates, said collar, anchoring-plates and ears being formed from one continuous strip of metal and means to draw said ears together, whereby said plates will be locked to the hose, substantially as and for the purpose set forth.

3. In a hose attachment the combination with the hose and a coupling member 2 having lugs 3, of an anchoring device formed entirely of one piece of material and comprising a ring-like member 4 having recesses adapted to receive the lugs 3 and also having seats 10 formed by bending a portion of the surface of the ring-like member outwardly, whereby said member 2 will be held against casual rotation when the lugs 3 enter said seats, semicircular anchoring-plates 6 extending at right angles to said ring-like member adapted to surround and grip the interposed hose, ears carried by each plate having registering orifices therein and bolts adapted to enter said orifices and draw said plates toward each other to clamp the hose, substantially as specified and for the purpose set forth.

4. The herein-described hose attachment comprising the combination with the hose and a coupling member having lugs upon opposite sides, of an anchoring-collar adapted to fit around the end of the coupling members, said collar having recesses in its inner edge adapted to receive said lugs; semicircular anchoring-plates 6 connected to said collar and means to lock said plates to the hose, substantially as and for the purpose set forth.

5. In a hose attachment, the combination with a hose and a coupling member having lugs, of a ring-like member having recesses and seats to receive said lugs said seats being at diametrically opposite points upon said ring-like member from the recesses and formed by bending a portion of said ring-like member outwardly, a pair of anchoring-plates semicircular in cross-section, each plate being of a size to practically inclose one-half of a contiguous part of a hose, one end of said plates being reduced in size and formed integral with the ring-like member, a pair of ears upon each meeting edge of said plates having registering openings therein, and bolts fitting said openings and adapted to clamp said plates to the hose, as set forth.

In testimony whereof I affix my signature in presence of two witnesses.

SIMON J. McDONALD.

Witnesses:
WM. WEBSTER,
W. H. LEWIS.